(12) United States Patent
Price

(10) Patent No.: US 10,237,316 B2
(45) Date of Patent: Mar. 19, 2019

(54) PROVIDING CONTENT IN A MULTICAST STREAM

(71) Applicant: Adtran Inc., Huntsville, AL (US)

(72) Inventor: Patrick A. Price, Madison, AL (US)

(73) Assignee: Adtran Inc., Huntsville, AL (US)

(*) Notice: Subject to any disclaimer, the term of this patent is extended or adjusted under 35 U.S.C. 154(b) by 539 days.

(21) Appl. No.: 14/692,812

(22) Filed: Apr. 22, 2015

(65) Prior Publication Data

US 2016/0315984 A1 Oct. 27, 2016

(51) Int. Cl.
| | |
|---|---|
| G06F 15/16 | (2006.01) |
| H04L 29/06 | (2006.01) |
| H04L 12/927 | (2013.01) |
| H04L 12/24 | (2006.01) |
| H04L 29/12 | (2006.01) |
| H04N 21/6405 | (2011.01) |
| H04L 12/725 | (2013.01) |
| H04L 12/26 | (2006.01) |

(52) U.S. Cl.
CPC .......... *H04L 65/60* (2013.01); *H04L 65/4076* (2013.01); *H04L 65/80* (2013.01); *H04L 41/0896* (2013.01); *H04L 43/08* (2013.01); *H04L 45/30* (2013.01); *H04L 47/806* (2013.01); *H04L 61/2069* (2013.01); *H04L 69/16* (2013.01); *H04N 21/6405* (2013.01)

(58) Field of Classification Search
CPC . H04L 65/4076; H04L 41/0677; H04L 47/38; H04L 65/60; H04L 65/80; H04L 69/16; H04L 47/806; H04L 41/0896; H04L 45/30; H04L 43/08; H04L 61/2069; H04N 21/2401; H04N 21/44209; H04N 21/6131; H04N 21/6405; H04W 4/06; H04W 52/0209; G01R 31/08
USPC ........ 709/219, 224, 231; 370/390, 230, 312, 370/249, 235; 725/62
See application file for complete search history.

(56) References Cited

U.S. PATENT DOCUMENTS

| | | | | |
|---|---|---|---|---|
| 6,973,081 | B1 * | 12/2005 | Patel ................... | H04L 12/1881 370/390 |
| 2007/0140242 | A1 * | 6/2007 | DiGiorgio ........... | H04L 12/1863 370/390 |
| 2007/0230360 | A1 * | 10/2007 | Nishi .................. | H04L 41/0677 370/249 |
| 2010/0333160 | A1 * | 12/2010 | Flinta .................. | H04L 12/1881 725/116 |

(Continued)

*Primary Examiner* — Jungwon Chang
(74) *Attorney, Agent, or Firm* — Fish & Richardson P.C.

(57) ABSTRACT

Methods, systems, and apparatus for providing content in a multicast stream are disclosed. In one aspect, analytical information of a plurality of individual data sessions between user devices and a content server is received. The analytical information of each of the plurality of individual data sessions is based on a packet inspection analysis of data transmitted in the respective individual data sessions. A same set of content being delivered to at least a portion of the user devices based on the analytical information is determined. In response to the determination, a multicast stream condition is determined to be met based on at least one performance metric of a network over which the same set of content is being delivered. In response to determining that the multicast stream condition has been met, a multicast stream that provides the content in a looping stream is initiated.

19 Claims, 4 Drawing Sheets

(56) References Cited

U.S. PATENT DOCUMENTS

| | | | | |
|---|---|---|---|---|
| 2012/0110167 A1* | 5/2012 | Joch | ................... | H04N 21/2401 |
| | | | | 709/224 |
| 2013/0097309 A1* | 4/2013 | Ma | ................... | H04L 29/08099 |
| | | | | 709/224 |
| 2013/0294321 A1* | 11/2013 | Wang | ..................... | H04W 4/06 |
| | | | | 370/312 |
| 2014/0016532 A1* | 1/2014 | Gouache | ............... | H04L 12/189 |
| | | | | 370/312 |
| 2014/0050082 A1* | 2/2014 | Sun | ......................... | H04L 47/38 |
| | | | | 370/230 |
| 2014/0359672 A1* | 12/2014 | Lin | ................. | H04N 21/44209 |
| | | | | 725/62 |
| 2015/0288733 A1* | 10/2015 | Mao | .................... | H04L 65/4076 |
| | | | | 709/219 |
| 2016/0309410 A1* | 10/2016 | Bhanage | ........... | H04W 52/0209 |

\* cited by examiner

300

PROVIDING CONTENT IN A MULTICAST STREAM

BACKGROUND

This specification relates to providing content in a multicast stream.

In a telecommunication network, a content source can use a content server to provide content to one or more user devices. In some cases, the content can be delivered in a data session between the content server and a user device. In some cases, the telecommunication network can deliver content from the content server to wireless user devices, wireline user devices, or a combination thereof.

SUMMARY

In general, one innovative aspect of the subject matter described in this specification can be embodied in methods for providing content in a multicast stream. Methods may include receiving analytical information of a plurality of individual data sessions between user devices and a content server; determining, by one or more data processing apparatus and based on the analytical information, that a same set of content is being delivered to at least a portion of the user devices; determining, by the one or more data processing apparatus and in response to the determination that the same set of content is being delivered and based on at least one performance metric of a network over which the same set of content is being delivered, that a multicast stream condition has been met; and initiating, in response to determining that the multicast stream condition has been met, a multicast stream that provides the content in a looping stream. The analytical information of each of the plurality of individual data sessions is based on a packet inspection analysis of data transmitted in the respective individual data sessions. Other embodiments of this aspect include corresponding devices and computer-readable media.

These and other embodiments can each optionally include one or more of the following features. Methods may include receiving data in an individual data session; performing a packet inspection analysis on the received data; and generating the analytical information of the individual data session based on the packet inspection analysis. At least a portion of the individual data session can be transmitted in a wireless communication network. The individual data session can be transmitted in accordance with a Transmission Control Protocol/Internet Protocol (TCP/IP) protocol. The multicast stream can be transmitted in accordance with an Internet Group Management Protocol (IGMP). Data transmitted in the multicast stream can include the data transmitted in the individual data session.

At least one performance metric of the network can include a predetermined threshold of network bandwidth, and the determination that the multicast stream condition has been met can include determining that a bandwidth of the network used to deliver the same set of content has exceeded the predetermined threshold of network bandwidth.

At least one performance metric of the network includes a predetermined number of user devices, and wherein the determination that the multicast stream condition has been met comprises determining that a number of individual data sessions delivering the same set of content has exceeded the predetermined number.

At least one performance metric of the network can include a predetermined number of identical packets being transmitted over a given portion of the network during a given time period.

Methods can include obtaining, after initiating the multicast stream and from a source of the same set of content, a current set of content provided by the source; comparing the current set of content to the same set of content; and managing the looping stream based on the comparison. The managing includes continuing to provide the same set of content in the looping stream when the current set of content matches the same set of content; and updating the looping stream to provide the current set of content when the current set of content does not match the same set of content.

Methods can include after initiating the looping stream, managing the looping stream based on a termination condition. The managing includes continuing to provide the looping stream while the termination condition is not met; and discontinuing the looping stream when the termination condition is met.

Particular embodiments of the subject matter described in this specification can be implemented so as to realize one or more of the following advantages. By determining whether the same set of content has been delivered to multiple user devices based on analytical information of the individual data sessions between a content server and the user devices, a network device can determine whether to use a multicast stream to provide the same content in a looping stream and, therefore, can reduce network traffic and congestion. Furthermore, a network operator can configure different network performance metrics to trigger the setup and/or tear down of multicast streams and, therefore, can customize the determination criteria of using multicast streams based on different network operation configurations and capabilities. Moreover, existing packet data analysis processes can be used to provide the analytical information and, therefore, reduce additional complexities in making the determination and managing the multicast streams. In addition, in some cases, the content can be provided and updated in a looping stream and, therefore, can enable various user devices to access the content at different times. Streaming content in a streaming loop when multiple user devices are requesting the same content can free up network bandwidth for use by other user devices that are requesting different content.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
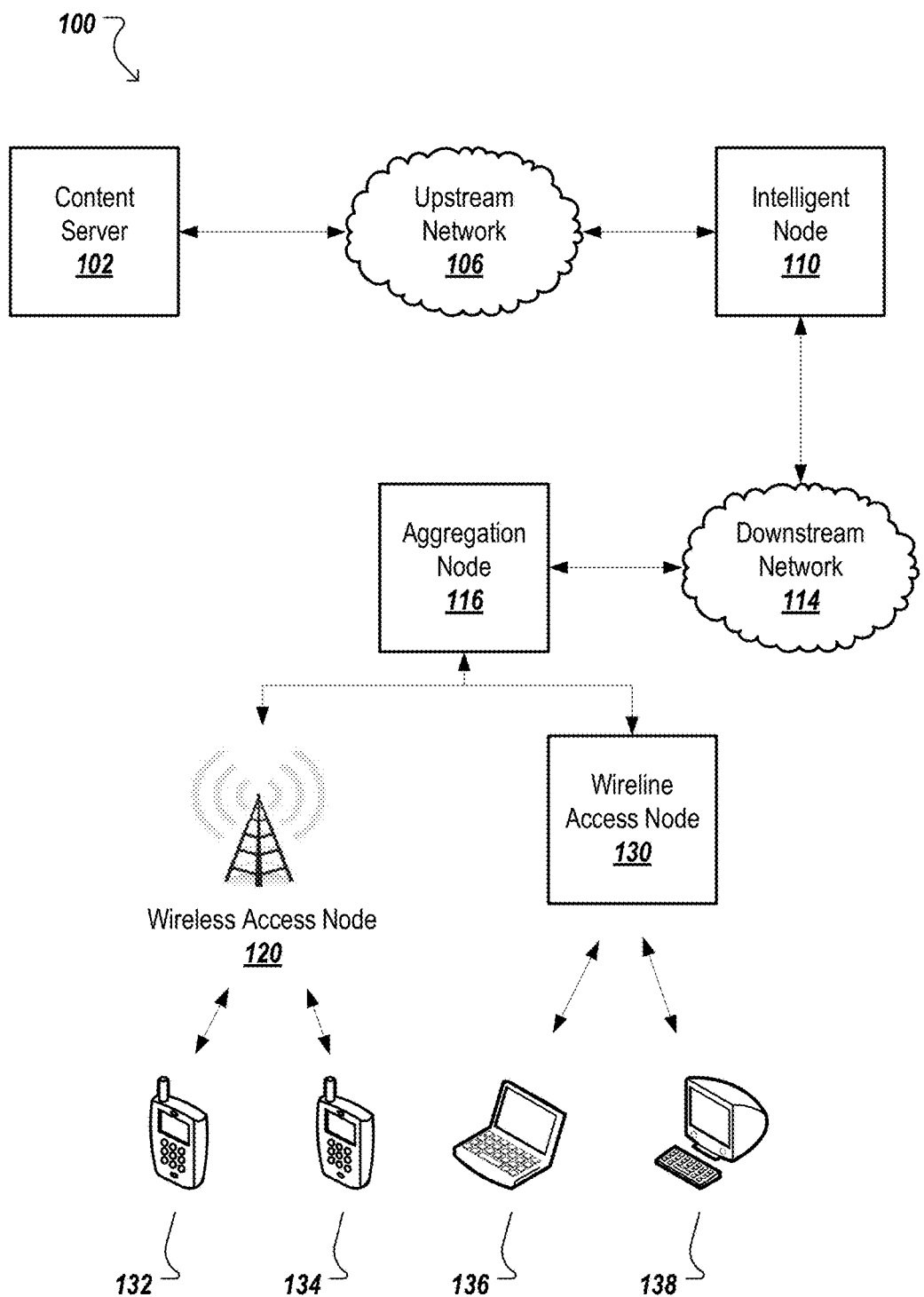
FIG. 1 is a block diagram of an example telecommunication network.

In a telecommunication network, the network performance can be negatively impacted if a large number of user devices are requesting content through the same network access point. For example, a large number of wireless user devices may be concentrated in a given geographic area (e.g., near a stadium, business conference, festival, or other event that draws a large number of attendees) where network access is provided by a limited number of access points. When these user devices request content, some network nodes may become congested and the network performance may be reduced. For example, the network may reduce the data rates for which the network can provide content for some user devices. Furthermore, the network may be unable to fulfill some requests for content by user devices altogether. These high-density scenarios are increasingly more common due to the proliferation of smart phones and other personal wireless devices and the ever-increasing demand of application content. For example, in an outdoor gathering event, e.g., a large concert or a sporting event, a significant population of people may occupy a relatively small geographic location for a great deal of time. When these events occur at sparse intervals or spontaneously, it may be difficult to allocate enough bandwidth to facilitate all requests for content by user devices in the location.

In some cases, the user devices in these congested regions may request the same content from the same content source. For example, a large number of audience members in a football stadium may want to know the scores of other games taking place on the same day, and they may use their smart phones, e.g., through a mobile application, to download the scores from the same content source, e.g., example.com/sportsscores. In some cases, the user devices may each establish a separate, individual data session with the content server of the content source to receive the same content. For example, an individual data session can be a single-recipient data stream, also referred to as a unicast stream. When each of the user devices establishes a separate individual data session to obtain the same content, a separate instance of that same content is transmitted over the network to each of the user devices. As such, the network aggregation nodes in these regions may be overloaded by a large amount of individual data sessions that are each carrying the same content, and the network performance is reduced because a large portion of the network bandwidth is being utilized to deliver multiple instances of the same content. For example, the data rates for the data sessions may be reduced as the number of content requests increases, and access to the network may be denied for some users. In some cases, a network node can reduce the traffic by caching commonly accessed content and delivering that content to user devices instead of fetching the same content every time from the content server. But the network node may still maintain multiple individual data sessions with the user devices to deliver the cached content.

As discussed in more detail below, in some cases, a set of data can be streamed to multiple user devices that have requested to be included in a group of user devices to which the set of data is addressed. Throughout this document, the term "multicast stream" will be used to refer to a set of content that is delivered to multiple recipients.

In some cases, the multicast stream can be transmitted in accordance to an Internet Group Management Protocol (IGMP). In some implementations, a user device can receive data transmitted in a multicast stream without establishing a unicast stream with the content server and, therefore, the network congestion can be reduced. In some cases, a multicast stream can also be transmitted in a broadcast format, where any user device in the coverage area of the network can receive the data transmitted in the multicast stream. For example, when a user cannot join a multicast stream or a multicast stream is otherwise unavailable, a broadcast stream can be used to deliver the content. In one example, a broadcast stream can be initiated in an emergency situation to inform all users that are connected to a given access point about the emergency situation, while available bandwidth for other communications are maintained through the given access point.

In some cases, as discussed in detail with respect to FIGS. 1-4, the multicast stream can deliver the content in a looping stream. In some cases, the content can have a finite size. For example, the content can include a static webpage, or a discrete set of data (e.g., one or more files that are used to render a given set of content). Therefore, the content can be transmitted repeatedly in a looping stream (e.g., a single instance of the data that is iteratively transmitted in the stream). Therefore, different user devices that request the same content at different times can access the same multicast stream and receive the requested content, instead of establishing individual data sessions and increasing network traffic.

As discussed in more detail below, an intelligent node in the network can determine whether to establish a multicast stream based on analytical information of the data packets transmitted in individual data sessions. In some cases, the analytical information can be obtained through packet data analysis of the data packets, and the intelligent node can coordinate with the content server and begin to send data in a multicast stream based on the analytical information and a multicast stream condition. The multicast stream condition can specify one or more network performance metrics upon which the intelligent node can determine whether to create a looping stream for a given set of content. In some cases, the intelligent node can continue to manage the multicast stream after initiating the multicast stream. For example, the intelligent node can update the data in the multicast stream if a new set of content is received from a content server (e.g., a web page represented by the data in the multicast stream is updated). The intelligent node can also terminate the multicast stream if the session condition is no longer met.

FIG. 1 is a block diagram of an example telecommunication network 100. The example telecommunication network 100 includes a content server 102 that provides content. The content server 102 can be, for example, a server that provides a web page or another network resource (e.g., data that can be distributed over the network and is stored at a network address) over the telecommunication network 100 in response to requests for the web page or network resource.

The telecommunication network 100 also includes an intelligent node 110 that communicates with the content server 102 through an upstream network 106 and an aggregation node 116 that communicates with the intelligent node 110 through a downstream network 114. In some cases, the upstream network 106 and the downstream network 114 can be a portion of the Internet. The telecommunication network 100 also includes a wireless access node 120 and a wireline access node 130 that are communicatively coupled with the aggregation node 116. As shown in FIG. 1, wireless user devices 132 and 134 are communicatively coupled with the wireless access node 120, and wireline user devices 136 and 138 are communicatively coupled with the wireline access node 130.

The user devices 132, 134, 136, or 138 can include any application, hardware, software, firmware, or combination thereof configured to receive data from the content server 102 in the example telecommunication network 100. Examples of the user devices 132, 134, 136, or 138 can include a cellular phone, personal data assistant (PDA), smart phone, laptop, tablet, personal computer (PC), pager, gaming device, wearable electronic device, or other communications device having components for communicating via a telecommunication network. As illustrated in FIG. 1, the user devices can include wireless user devices 132 and 134. The user devices can also include wireline user devices 136 and 138.

The wireless access node 120 can include any application, hardware, software, firmware, or combination thereof configured to provide wireless access to the wireless user devices 132 and 134. The wireless access node 120 can include one or a plurality of radio access networks (RANs), core networks (CNs), and external networks. The RANs can include one or more radio access technologies. In some implementations, the radio access technologies may be Wireless Local Area Network (WLAN), Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks can include evolved packet cores (EPCs).

The wireline access node 130 can include any application, hardware, software, firmware, or combination thereof configured to provide wireline access to the wireline user devices 136 and 138. The wireline access node 130 can provide one or more wireline access technologies. In some implementations, the wireline access technologies can include Digital Subscriber Line (DSL), Asymmetric Digital Subscriber Line (ADSL), fiber optics, Ethernet, Integrated Services Digital Network (ISDN), coaxial cable, or other Wide Area Network (WAN) or Local Area Network (LAN) technologies. In some instances, the wireline access node 130 and the wireless access node 120 can share one or more network components.

The aggregation node 116 can include any application, hardware, software, firmware, or combination thereof configured to aggregate data traffic in the example telecommunication network 100. In the illustrated example, the aggregation node 116 aggregates data traffic for the wireless access node 120 and the wireline access node 130. In some implementations, the aggregation node 116 can aggregate data received from the wireless access node 120 and the wireline access node 130, and transmit the aggregated data to the intelligent node 110 over the downstream network 114. In some implementations, the aggregation node 116 can receive data from the intelligent node 110, and transmit the received data to the wireless access node 120 and the wireline access node 130.

The intelligent node 110 can include any application, hardware, software, firmware, or combination thereof configured to initiate (and/or end) a multicast stream in the example telecommunication network 100. As discussed in more detail with respect to FIGS. 2-4, the intelligent node 110 can determine whether to initiate a multicast stream based on a multicast stream condition and analytical information of the unicast streams between the user devices 132, 134, 136, or 138 and the content server 102. For example, if the intelligent node 110 determines that transmission of the same data (or matching data) is being delivered to at least a threshold number of the user devices 132, 134, 136, or 138, the intelligent node can determine that a multicast stream should be initiated. In turn, the intelligent node 110 can initiate the multicast stream based on the determination, continue to update the multicast stream, and/or terminate the multicast stream when the multicast stream session condition is no longer met.

The content server 102 can include any application, hardware, software, firmware, or combination thereof configured to provide content from an information source in the example telecommunication network 100. For example, the content can include score updates, stock quotes, weather information, video, music, or any other data files that the user devices 132, 134, 136, or 138 may download. In some cases, the content server 102 can establish unicast streams with the user devices 132, 134, 136, or 138 to deliver the content.

The upstream network 106 can include any application, hardware, software, firmware, or combination thereof configured to facilitate communication between the intelligent node 110 and the content server 102. The downstream network 114 includes any application, hardware, software, firmware, or combination thereof configured to facilitate communications between the intelligent node 110 and downstream network elements. As used throughout this document, the phrase downstream network elements refer to network elements between a network node and user devices. In the illustrated example, the downstream network 114 provides connections between the intelligent node 110 and the aggregation node 116. In some implementations, the upstream network 106 and downstream network 114 can be portions of a wireless communication network or a wireline communication network. The upstream network 106 and downstream network 114 can also be a memory pipe, a hardware connection, or any internal or external communication paths between the components in the example telecommunication network 100.

Figure 2:
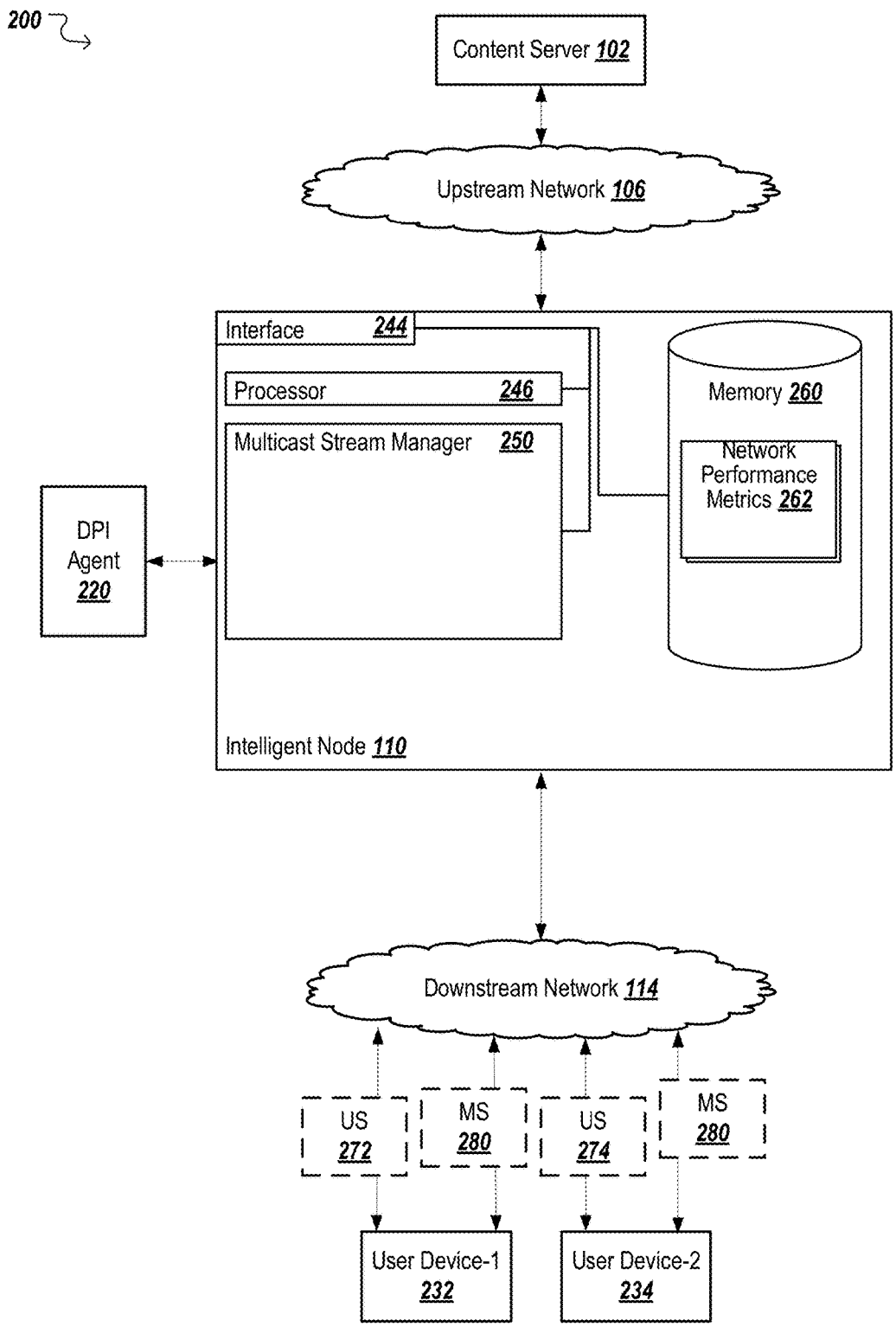
FIG. 2 is a block diagram of an example telecommunication network in which content is provided in a multicast stream.

FIG. 2 is a block diagram of an example telecommunication network 200 in which content is provided in a multicast stream. As illustrated, the example telecommunication network 200 includes a content server 102 that is communicatively coupled with an intelligent node 110 through an upstream network 106, a user device-1 232, and a user device-2 234 that are communicatively coupled with the intelligent node 110 through a downstream network 114 and a Deep Packet Inspection (DPI) agent 220 that is communicatively coupled with the intelligent node 110.

In some cases, the user device-1 232 can establish a unicast stream 272 with the content server 102 and receive, within that unicast stream 272, a set of content from the content server 102. Similarly, the user device-2 234 can establish a unicast stream 274 with the content server 102 and receive, within the unicast stream 274, a set of content from the content server 102. In some implementations, the unicast streams 272 and 274 are transmitted in TCP/IP connections.

Figure 3A:
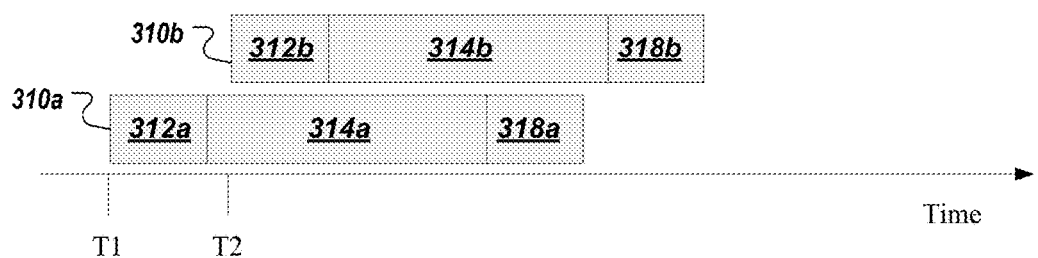
FIG. 3A is a block diagram illustrating example session data that are transmitted in individual data sessions.

In some cases, the user device-1 232 and the user device-2 234 receive the same set of content from the content server 102. In these cases, each unicast stream 272 and 274 will include a separate instance of the set of content provided by the content server 102. FIG. 3A is a block diagram 300 illustrating example session data that are transmitted in unicast streams, e.g., the unicast stream 272 and 274 in FIG. 2. The block diagram 300 includes a session data 310*a* that is transmitted in the unicast streams 272 and a session data 310b that is transmitted in the unicast streams 274. As illustrated by FIG. 3A, the unicast stream 272 can be established at time T1, which corresponds to the time at which the user device-1 232 requests content from the content server 102. Similarly, the unicast stream 274 can be established at time T2, which corresponds to the time at which the user device-2 234 requests content from the content server 102. Note that T1 and T2 can be different times or the same time, as the content server 102 can generally process multiple requests simultaneously.

In some implementations, as illustrated, the session data 310a can include a beginning data unit 312a that indicates the starting point of the session data 310a, and an end data unit 318a that indicates the ending point of the session data 310a. The beginning data unit 312a and the end data unit 318a can be one or more bits, one or more bytes, a flag, or other data units that indicate the beginning or the end of a session data, respectively. The session data 310a can also include the data content 314a. The data content 314a can include data packets for the set of content delivered in the unicast stream 272. Similarly, the session data 310b can include a beginning data unit 312b that indicates the starting point of the session data 310b, an end data unit 318b that indicates the ending point of the session data 310b, and data content 314b that includes data packets for the set of content delivered in the unicast stream 274. In some cases, the unicast streams 272 and 274 can transmit the same set of content. Therefore, the data content 314a and the data content 314b can include the same data packets.

Referring to FIG. 2, the network 200 can also include a DPI agent 220. The DPI agent 220 can include any application, hardware, software, firmware, or combination thereof configured to perform packet inspection analysis on a data packet transmitted in the example telecommunication network 200. In some implementations, the DPI agent 220 can be co-located with another node the in the example telecommunication network 200. For example, the DPI agent 220 can be implemented as a component of the intelligent node 110. In some implementations, the DPI agent 220 can be implemented as a stand-alone component.

The DPI agent 220 can provide analytical information of the data packets transmitted in the network for network management purposes. In some implementations, the DPI agent 220 can receive a data packet transmitted in the network 200 and perform deep packet inspection on the data packet to obtain analytical information of the data packet. In some cases, the data packet includes a header and encapsulated data. The header can indicate the source address and the target address of the data packet. For example, if the data packet is delivered from the content server 102 to the user device-1 232, the header can include the address of the content server 102 as the source address, and the address of the user device-1 232 as the target address.

The encapsulated data can include data for the content that is delivered from the content server 102 to the user device-1 232. For example, the encapsulated data can include the session data 310a (and/or 310b). In some cases, the encapsulated data, the header, or a combination thereof is encrypted. The analytical information can include the target address, the source address, a portion of the encapsulated data of the data packet, a hashing value of a portion of the data packet, or a combination thereof. In an example, the DPI agent 220 can inspect the session data 310a (and/or 310b) to obtain information about the content being delivered in the unicast stream 272 (and/or 274). In some cases, e.g., if the encapsulated data is encrypted, the DPI agent 220 can decrypt the data packet to obtain the encapsulated data. Alternatively or in combination, the DPI agent 220 can perform a hashing function on the data packet to obtain the analytical information. For example, the DPI agent 220 can apply the hashing function to the data content 314a to obtain a "signature" of the data content 314a. Similarly, the DPI agent 220 can also apply the hashing function to the data content 314b to obtain a "signature" of the data content 314b. If these hashes match, the data content 314a and the data content 314b can be considered matching (e.g., be the same). The DPI agent 220 can provide the analytical information to the intelligent node 110.

As discussed in more detail below, the intelligent node 110 manages communications over the network 200 based on the analytical information provided by the DPI agent 220. For example, if multiple unicast streams (e.g., 272 and 274) are determined to be delivering a same set of content (e.g., based on matching hashes of the data content), the intelligent node 110 can establish a multicast stream 280 to deliver that same set of content in a looping stream. The intelligent node 110 can include any application, hardware, software, firmware, or combination thereof configured to initiate, update, manage, and terminate a multicast stream. As illustrated, the intelligent node 110 includes an interface 244, a processor 246, a multicast stream manager 250, and a memory 260. Each of these elements will be discussed in turn below, and can each include any application, hardware, software, firmware, or combination thereof configured to facilitate the operations and functionality discussed below.

The interface 244 is configured to provide communications between the intelligent node 110 and other components in the example telecommunication network 200. In some cases, the interface 244 can include software supporting one or more communication protocols associated with the communications in the illustrated network 200. Alternatively or in combination, the interface 244 can include hardware that is operable to communicate physical signals within and outside of the illustrated network 200.

As illustrated in FIG. 2, the intelligent node 110 includes a processor 246. Although illustrated as a single processor 246 in FIG. 2, two or more processors may be used according to particular needs, desires, or particular implementations of the network 200. Each processor 246 may be a central processing unit (CPU), an application specific integrated circuit (ASIC), a field-programmable gate array (FPGA), or another suitable component. The processor 246 can execute instructions and manipulate data to perform the operations of the intelligent node 110. For example, the processor 246 can execute the algorithms and operations described in the illustrated figures, including the operations for performing the functionality associated with the intelligent node 110, generally, as well as various software modules, including the functionality for sending communications to and receiving transmissions from the multicast stream manager 250.

As illustrated in FIG. 2, the intelligent node 110 also includes a memory 260 that stores data for the intelligent node 110. Although illustrated as a single memory 260 in FIG. 2, two or more memories may be used according to particular needs, desires, or particular implementations of the intelligent node 110. While memory 260 is illustrated as an integral component of the intelligent node 110, in alternative implementations, memory 260 can be external to the intelligent node 110.

The memory 260 can store one or more network performance metrics 262. The network performance metrics 262 can be configured by the network operators/administrators to manage data traffic. For example, the network performance metrics 262 can include a predetermined threshold of network bandwidth, a predetermined number of user devices, a predetermined number of identical packets being transmitted over a given portion of the network during a given time period, other network operating characteristics, or any combination thereof. As discussed in more detail below, the multicast stream manager 250 can determine whether a multicast stream condition has been met based on one or more network performance metrics 262.

The multicast stream manager 250 can be configured to manage multicast streams. In some cases, the multicast stream manager 250 is configured to receive analytical information from the DPI agent 220. As described previously, the analytical information can be based on the data packets transmitted in the unicast streams 272 and 274. In some cases, the multicast stream manager 250 can determine whether the multicast stream condition has been met based on the analytical information and one or more network performance metrics 262.

In some implementations, the multicast stream condition can require a determination that a same set of content is being delivered to multiple user devices. For example, the multicast stream manager 250 can determine that the same set of content has been transmitted in the unicast streams 272 and 274 based on the analytical information of the unicast streams 272 and 274. In a particular example, the multicast stream manager 250 can determine that the session data 310a and 310b include the same data content based on these session data having matching source addresses, target addresses, encapsulated data, hash values of the encapsulated data, or a combination thereof. For example, the multicast stream manager 250 can determine that the session data 310a and 310b have the same source address. The multicast stream manager 250 can also determine that the session data 310a and 310b have the same encapsulated data, or the same hashing values of the encapsulated data. Therefore, the multicast stream manager 250 can determine that the session data 310a and 310b are delivering the same content from the content server 102. In some cases, the multicast stream manager 250 can determine that the data packets in the session data 310a and 310b are substantially the same. For example, the amount of the same encapsulated data or the same hashing values of the encapsulated data in the session data 310a and 310b exceed a predetermined threshold. In these or other cases, the multicast stream manager 250 can also determine that the session data 310a and 310b deliver the same content.

In some cases, the multicast stream manager 250 can determine that the multicast stream condition is met based on a network performance metric 262. In some implementations, the network performance metric 262 can specify that at least a predetermined number of identical packets be transmitted over a given portion of the network during a given time period in order for the multicast stream condition to be met. A given portion of the network can be a network node or a segment of network connections between two network nodes. For example, a network operator can configure the given portion of the network to be an aggregation node in the network 200, the given time period to be 60 seconds, and the predetermined number to be 100. In this example, if the multicast stream manager 250 determines that 100 identical packets have been transmitted over the aggregation node within the last 60 seconds, the multicast stream manager 250 can determine that the multicast stream condition has been met, and it will be more efficient for the network to use a multicast stream to transmit the same set of content instead of transmitting multiple different instances of the same set of content to different user devices using unicast streams.

In some cases, the network performance metric 262 can include a predetermined threshold of network bandwidth to be utilized in order for the multicast stream condition to be met. The predetermined threshold can be based on data rates, payload size, or a percentage of network capacity. For example, if the same set of content has been transmitted in the unicast streams 272 and 274, and the bandwidth used to deliver the same set of content has exceeded the predetermined threshold bandwidth, the multicast stream manager 250 can determine that the multicast stream condition has been met.

In some cases, the network performance metric 262 can specify that a predetermined number of user devices must be requesting the same content in order for the multicast stream condition to be met. In this example, if the number of unicast streams delivering the same set of content has exceeded the predetermined number, the multicast stream manager 250 can determine that the multicast stream condition has been met (assuming any other conditions have also been met). In some cases, the network operator can configure the multicast stream condition to include any combination of the network performance metrics discussed above.

When the multicast stream condition is met, the multicast stream manager 250 can initiate a multicast stream that provides the content. In some cases, the multicast stream manager 250 can receive content from the content server 102 through the upstream network 106 and provide the content in the multicast stream 280 through the downstream network 114 to the user devices 232 and 234, or any other user devices in the network 200.

In some cases, the multicast stream 280 can be provided according to the Internet Group Management Protocol (IGMP) over the User Datagram Protocol (UDP) layer. For example, the multicast stream 280 can be implemented using an IGMP multicast stream. The multicast stream 280 can also be implemented using other multicast stream protocols (or a broadcast protocol). A user device that is interested in receiving the content can join the multicast stream 280 to receive data instead of establishing its unicast stream. In one example, a user device can initiate a request for the content. The multicast stream manager 250 can receive the request and determine that the content is delivered through a multicast stream. The multicast stream manager 250 can inform the user device that the content is delivered in a multicast stream session. The user device can join the multicast stream to obtain the content.

Figure 3B:
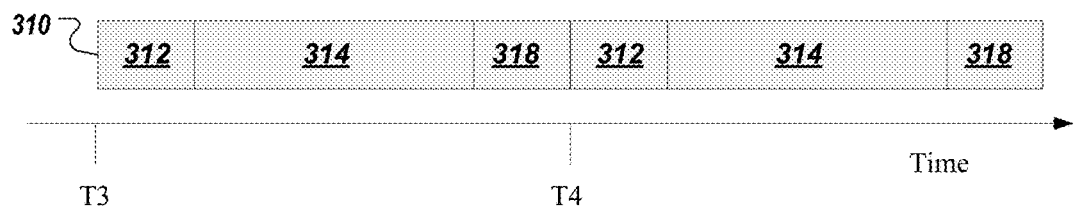
FIG. 3B is a block diagram illustrating an example session data that is transmitted in a multicast stream.

FIG. 3B is a block diagram illustrating an example session data 310 that is transmitted in a multicast stream, e.g., the multicast stream 280 in FIG. 2. In some implementations, as illustrated, the session data 310 can include a beginning data unit 312 that indicates the starting point of the session data 310, and an end data unit 318 that indicates the ending point of the session data 310. The session data 310 can also include the data content 314 that includes the data packets for the set of content delivered in the multicast stream 280. In some cases, as illustrated, the session data 310 can be a looping stream. As illustrated, the data content 314 is transmitted at T3, and then repeated at T4. As illustrated, the beginning data unit 312 and the end data unit 318 indicate the starting point and ending point of each copy of the data content 314. This approach enables user devices that join the multicast stream 280 at different times to receive the data content 314. Each user device will obtain the same instance of the data content 314 rather than each obtaining separate instances (e.g., copies) of the data content 314a, 314b as shown in FIG. 3A. Thus, the amount of bandwidth utilized to provide the same data content 314 to multiple different user devices is reduced by using the multicast stream rather than the unicast streams.

Referring to FIG. 2, in some cases, after the multicast stream 280 is initialized, the unicast streams 272 and 274 can continue to run until the sessions are completed. The user devices 232 and 234 can then join the multicast stream 280 to receive the content. In some cases, the set of content delivered in the multicast stream 280 includes the same set of content delivered in the unicast streams 272 and 274. In some cases, the unicast streams 272 and 274 can be terminated after the multicast stream 280 is initialized.

In some cases, the multicast stream manager 250 can continue to update the multicast stream 280 after the multicast stream 280 is initialized. For example, the intelligent node 110 can continue to obtain content from the content server 102. The multicast stream manager 250 can compare received content and determine whether the content has changed. If the content has not changed, the multicast stream manager 250 can continue to deliver the same session data in a looping stream as described above. If the content has changed, the multicast stream manager 250 can update the session data 310 by inserting the new set of content in the session data 310. The user devices 232 and 234 can segment the data content 314 using the beginning data unit 312 and the end data unit 318 and determine whether the content has changed.

In some cases, the multicast stream manager 250 can continue to manage the data traffic after the multicast stream 280 is initialized. For example, the multicast stream manager 250 can check whether a termination condition is met. In some cases, the termination condition can be set to be the same as the multicast stream condition. In these cases, if the multicast stream condition continues to be met, the multicast stream manager 250 can continue to deliver the content in the multicast stream 280. If the multicast stream condition is no longer met, the multicast stream manager 250 can terminate the multicast stream 280, and the user devices 232 and 234 can establish individual unicast streams with the content server 102 to receive the content. In some cases, the termination condition can be different than the multicast stream condition. For example, the termination condition can be based on the number of subscribers to the multicast stream 280. In this example, if the number of subscribers is below a predetermined number, the multicast stream manager 250 can terminate the multicast stream 280, and the user devices 232 and 234 can establish individual unicast streams with the content server 102 to receive the content.

Figure 4:
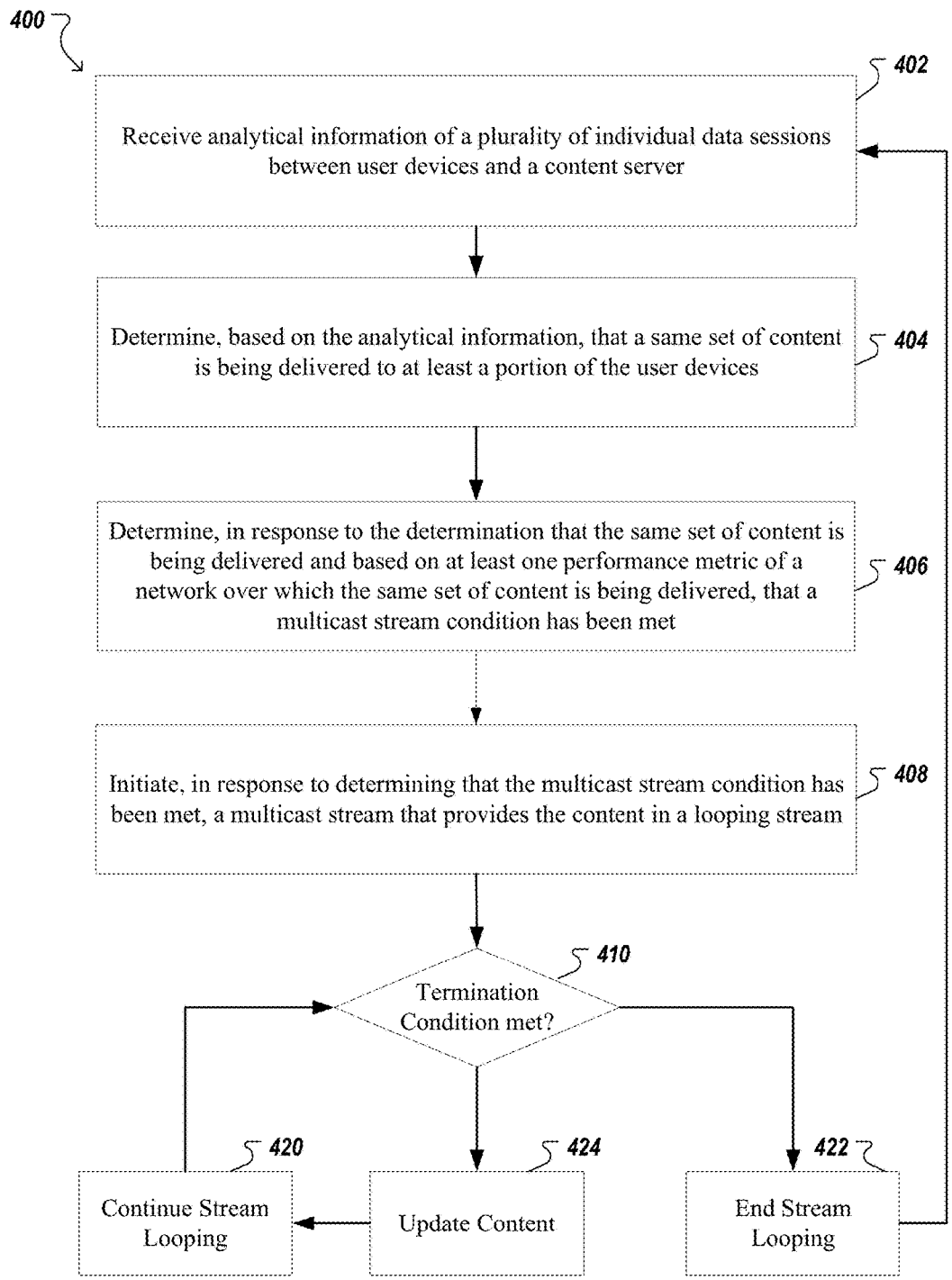
FIG. 4 is a flowchart of an example process for providing content in a multicast stream.

FIG. 4 is a flowchart of an example process 400 for providing content in a multicast stream. The example process 400 can be performed, for example, by one or more devices such as those described with reference to FIGS. 1-3. The example process 400 can also be implemented as instructions stored on a non-transitory, computer-readable medium that, when executed by one or more devices, configures one or more devices to perform and/or cause the one or more devices to perform the operations of the example process 400.

Analytical information for a plurality of individual data sessions between user devices and a content server is received (402). In some cases, as discussed above with reference to FIGS. 1-3, at least a portion of the individual data session is transmitted in a wireless communication network. In some instances, the individual data session is transmitted in accordance to a TCP/IP protocol. The analytical information of each of the plurality of individual data sessions is based on a packet inspection analysis of data transmitted in the respective individual data sessions. In some implementations, the data in each of the individual data sessions can be received, and a packet inspection analysis can be performed on the received data. In turn, the analytical information of the individual data sessions can be generated based on the packet inspection analysis of the received data.

A determination is made that a same set of content is being delivered to at least a portion of the user devices (404). In some implementations, the determination is based on the received analytical data. For example, as discussed above with reference to FIG. 2, the determination that multiple user devices are being sent the same set of content can be based on a determination that hashes of data being sent to each of the multiple user devices matches.

After determining that the same set of content is being delivered, a determination is made that a multicast stream condition has been met (406). In some implementations, the determination that the multicast stream session condition has been met is based on at least one performance metric of a network over which the same set of content is being delivered. For example, as discussed above with reference to FIGS. 1-3, at least one performance metric can require a predetermined threshold of network bandwidth be occupied in order for the stream condition to be met. In this or other examples, the multicast stream condition can be determined to be met if the bandwidth of the network used to deliver the same set of content has exceeded the predetermined threshold of network bandwidth. In another example, at least one performance metric can require that a predetermined number of user devices must request the same content in order for the multicast stream condition to be met. In this or other examples, the multicast stream condition can be determined to be met if a number of individual data sessions delivering the same set of content has exceeded the predetermined number. In yet another example, at least one performance metric can require that a predetermined number of identical packets be transmitted over a given portion of the network during a given time period in order for the multicast stream condition to be met. In this or other examples, the multicast stream condition can be determined to be met if the number of identical packets being transmitted over a given portion of the network during a given time period has exceeded the predetermined number of identical packets.

In response to determining that the multicast stream condition has been met, a multicast stream is initiated (408). The multicast stream provides the content in a looping stream. In some implementations, the multicast stream is transmitted in accordance to an Internet Group Management Protocol (IGMP). In some implementations, data transmitted in the multicast stream can include the data transmitted in the individual data session.

The looping stream can also be managed based on the termination condition (410). Until the termination condition is met, the example process 400 proceeds to 424, where the content in the looping stream is updated. In some implementations, after initiating the multicast stream, a current set of content provided by the source can be obtained from a source of the same set of content. The current set of content can be compared to the same set of content. If the current set of content matches the same set of content, the same set of content can be continuously be provided in the looping stream (e.g., without a content update). If the current set of content does not match the same set of content, the looping stream can be updated to provide the current set of content instead of the previously provided same set of content. After updating the content, the example process 400 proceeds to 420, where the looping stream continues to be provided with the current set of content. When the termination condition is met, the example process 400 proceeds to 422, where the looping stream is ended.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
receiving analytical information of a plurality of individual data sessions between user devices and a content server, wherein the analytical information of each of the plurality of individual data sessions is based on a packet inspection analysis of data transmitted in the respective individual data sessions;
determining, by one or more data processing apparatus and based on the analytical information, that a same set of content is being delivered from the content server to multiple different user devices via multiple different individual data sessions that are each implemented using a different unicast stream;
determining, by the one or more data processing apparatus and in response to the determination that the same set of content is being delivered to the multiple different user devices and based on at least one performance metric of a network over which the same set of content is being delivered, that a multicast stream condition has been met;
initiating, in response to determining that the multicast stream condition has been met, a multicast stream that provides the same set of content to the multiple different user devices in a same looping multicast stream;
obtaining, after initiating the multicast stream and from a source of the same set of content, a current set of content provided by the source;
comparing the current set of content to the same set of content; and
managing the looping stream based on the comparison, the managing including:
continuing to provide the same set of content in the looping stream when the current set of content matches the same set of content; and
updating the looping stream to provide the current set of content when the current set of content does not match the same set of content.

2. The method of claim 1, further comprising:
receiving data in an individual data session;
performing a packet inspection analysis on the received data; and
generating the analytical information of the individual data session based on the packet inspection analysis.

3. The method of claim 1, wherein at least a portion of the individual data session is transmitted in a wireless communication network.

4. The method of claim 1, wherein the individual data session is transmitted in accordance with a Transmission Control Protocol/Internet Protocol (TCP/IP) protocol.

5. The method of claim 1, wherein the multicast stream is transmitted in accordance with an Internet Group Management Protocol (IGMP).

6. The method of claim 1, wherein data transmitted in the multicast stream includes the data transmitted in the individual data session.

7. The method of claim 1, wherein the at least one performance metric of the network includes a predetermined threshold of network bandwidth, and wherein the determination that the multicast stream condition has been met comprises determining that a bandwidth of the network used to deliver the same set of content has exceeded the predetermined threshold of network bandwidth.

8. The method of claim 1, wherein the at least one performance metric of the network includes a predetermined number of user devices, and wherein the determination that the multicast stream condition has been met comprises determining that a number of individual data sessions delivering the same set of content has exceeded the predetermined number.

9. The method of claim 1, wherein the at least one performance metric of the network includes a predetermined number of identical packets being transmitted over a given portion of the network during a given time period.

10. The method of claim 1, further comprising:
after initiating the looping stream, managing the looping stream based on a termination condition, wherein the managing comprises:
continuing to provide the looping stream while the termination condition is not met; and
discontinuing the looping stream when the termination condition is met.

11. A device, comprising:
a memory; and
at least one hardware processor interoperably coupled with the memory and configured to:
receive analytical information of a plurality of individual data sessions between user devices and a content server, wherein the analytical information of each of the plurality of individual data sessions is based on a packet inspection analysis of data transmitted in the respective individual data sessions;
determine, based on the analytical information, that a same set of content is being delivered from the content server to multiple different user devices via multiple different individual data sessions that are each implemented using a different unicast stream;
determine, in response to the determination that the same set of content is being delivered to the multiple different user devices and based on at least one performance metric of a network over which the same set of content is being delivered, that a multicast stream condition has been met;

initiate, in response to determining that the multicast stream condition has been met, a multicast stream that provides the same set of content to the multiple different user devices in a same looping multicast stream;

obtain, after initiating the multicast stream and from a source of the same set of content, a current set of content provided by the source;

compare the current set of content to the same set of content; and manage the looping stream based on the comparison, the managing including:
continuing to provide the same set of content in the looping stream when the current set of content matches the same set of content; and
updating the looping stream to provide the current set of content when the current set of content does not match the same set of content.

12. The device of claim 11, wherein the at least one hardware processor is further configured to:
receive data in an individual data session;
perform a packet inspection analysis on the received data; and
generate the analytical information of the individual data session based on the packet inspection analysis.

13. The device of claim 11, wherein at least a portion of the individual data session is transmitted in a wireless communication network, the individual data session is transmitted in accordance with a TCP/IP protocol, and the multicast stream is transmitted in accordance with an Internet Group Management Protocol (IGMP).

14. The device of claim 11, wherein data transmitted in the multicast stream includes the data transmitted in the individual data session.

15. The device of claim 11, wherein the at least one performance metric of the network includes a predetermined threshold of network bandwidth, and wherein the determination that the multicast stream condition has been met comprises determining that a bandwidth of the network used to deliver the same set of content has exceeded the predetermined threshold of network bandwidth.

16. The device of claim 11, wherein the at least one performance metric of the network includes a predetermined number of user devices, and wherein the determination that the multicast stream condition has been met comprises determining that a number of individual data sessions delivering the same set of content has exceeded the predetermined number.

17. The device of claim 11, wherein the at least one performance metric of the network includes a predetermined number of identical packets being transmitted over a given portion of the network during a given time period.

18. The device of claim 11, wherein the at least one hardware processor is further configured to:
after initiating the looping stream, manage the looping stream based on a termination condition, wherein the managing comprises:
continuing to provide the looping stream while the termination condition is not met; and
discontinuing the looping stream when the termination condition is met.

19. A non-transitory, computer-readable medium storing computer-readable instructions executable by a computer and configured to:
receive analytical information of a plurality of individual data sessions between user devices and a content server, wherein the analytical information of each of the plurality of individual data sessions is based on a packet inspection analysis of data transmitted in the respective individual data sessions;
determine, based on the analytical information, that a same set of content is being delivered from the content server to multiple different user devices via multiple different individual data sessions;
determine, in response to the determination that the same set of content is being delivered to the multiple different user devices and based on at least one performance metric of a network over which the same set of content is being delivered, that a multicast stream condition has been met; and
initiate, in response to determining that the multicast stream condition has been met, a multicast stream that provides the same set of content to the multiple different user devices in a same looping multicast stream;
obtain, after initiating the multicast stream and from a source of the same set of content, a current set of content provided by the source;
compare the current set of content to the same set of content; and
manage the looping stream based on the comparison, the managing including:
continuing to provide the same set of content in the looping stream when the current set of content matches the same set of content; and
updating the looping stream to provide the current set of content when the current set of content does not match the same set of content.

* * * * *